July 19, 1966 G. V. MULLENS 3,261,441
RUBBISH DISPOSAL ARRANGEMENT
Filed Dec. 4, 1964
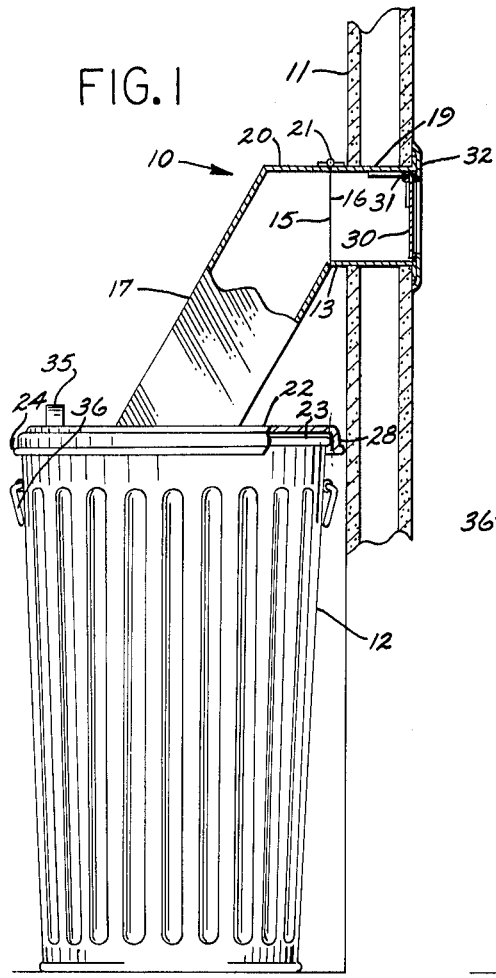
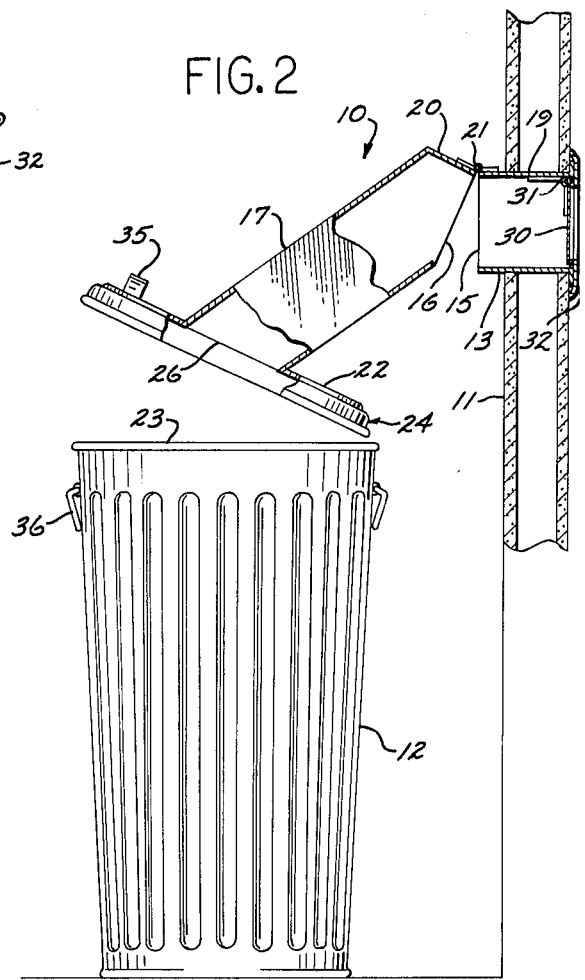
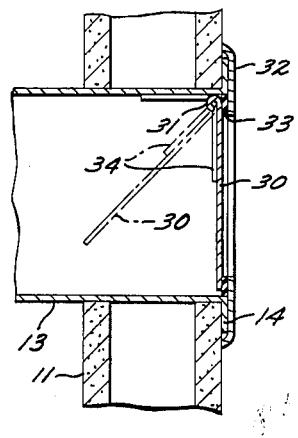
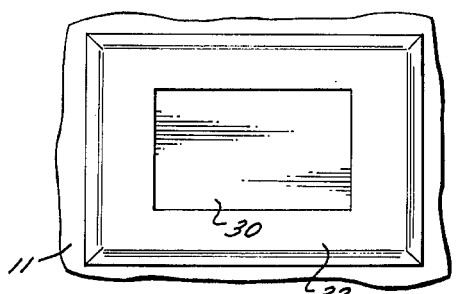
INVENTOR
GAIL V. MULLENS
BY
ATTORNEYS

United States Patent Office 3,261,441
Patented July 19, 1966

3,261,441
RUBBISH DISPOSAL ARRANGEMENT
Gail V. Mullens, 742 W. 129th St., Gardena, Calif.
Filed Dec. 4, 1964, Ser. No. 415,929
4 Claims. (Cl. 193—33)

This invention provides for rubbish disposal and, more particularly, to a device having a pivotal chute extending through a wall to a container.

It has long been recognized that the disposal of rubbish may be facilitated by the provision of a chute extending to the ouside or a basement, connecting to a receptacle adapted to receive the rubbish. This means that the refuse can be discarded with ease and is immediately out of sight, while saving on the floor space normally occupied by a waste basket or the like. In the past, however, there has been no system readily adapted for general domestic and commercial use. One problem has centered around providing a chute that is sealed at the location of the container, yet which will allow the receptacle to be removed from the chute for ultimate disposal of the rubbish. One proposal, for example, has been to provide a chute that fits through a hole formed in the lid for the receptacle. In removing the receptacle, the lid is slid vertically upwardly along the exterior of the chute so that the container can be taken away. However, there is a tendency for the lid to bind on the exterior of the chute, making it hard to slide. On the other hand, if clearance is opened up to make the relative movement of the lid and chute less difficult, there is a loss of any seal between the lid and chute so that leakage of moisture and vapors can occur. Also, this type design requires vertical alignment of the chute so that the lid will have the proper attitude with respect to the receptacle. Moreover, the receptacle must be positioned with some exactness when it is returned in order that the lid can be slid down along the chute to engage it properly. In addition, prior designs have generally lacked provisions for sealing the chute against odors being transmitted from the container to the location of the chute entrance.

The present invention overcomes such difficulties through a chute that is in two sections hinged together. The bottom section is secured to a container through a permanent sealed attachment. An opening in the lid transmits the refuse from the chute to the container. The rubbish container is removed merely by lifting up on the lid to cause the chute section to pivot as the receptacle is slid outwardly. Return is effected easily by shoving the container back in place, and the container automatically aligns itself with the lid as this is done. A spring-loaded door is provided at the chute entrance, sealing off the interior of the chute and enhancing the appearance from the inside where the door is located.

An object of this invention is to provide an improved refuse disposal arrangement.

Another object of this invention is to provide a pivotal rubbish chute design facilitating container removal and return.

A further object of this invention is to provide a rubbish chute arrangement in which the rubbish container is kept closed and sealed.

An additional object of this invention is to provide a rubbish chute that prevents transmission of odors from the receptacle.

Yet another object of this invention is to provide a rubbish chute that is convenient to use and easily cleaned.

These and other objects will become apparent from the following detailed description taken in conjunction with the accompanying drawings in which:

FIGURE 1 is a side elevational view, partially in section, illustrating the rubbish disposal arrangement of this invention in its normal position;

FIGURE 2 is a view similar to FIGURE 1 with the chute pivoted upwardly as the rubbish container is removed;

FIGURE 3 is an enlarged fragmentary sectional view of the entrance portion of the rubbish disposal chute; and FIGURE 4 is a front elevational view of the entrance portion of the chute.

With reference to the drawing, the rubbish chute 10 of this invention is illustrated as extending through an opening formed in the wall 11 to provide communication to a rubbish receptacle 12. Typically, the wall 11 will be the outside wall of a house in the kitchen area with the chute located, for example, above the drainboard (not shown). However, the device will serve as well in bathrooms or other locations, and can be associated with commercial buildings as well as houses. The refuse container 12 can be located outside the building, as shown, or in a basement or other area separate from the occupied part of the building.

The chute 10 is made up of an entrance section 13 that fits through the wall 11 and is substantially flush with the interior of the wall. A flashing 14 is bent outwardly along the inner wall surface, locating the inner end of the chute section 13. The section 13 usually is constructed as a sheet metal tubular element of rectangular or square cross-sectional configuration. The outer end 15 of the chute entrance portion 13 complementarily engages the upper edge 16 of the second chute section 17. The latter element is similar to the chute portion 13 in that it is also normally made of metal and square or rectangular in cross section. Other materials may be used, however, and it is not critical that the chute elements have this cross-sectional shape.

The upper horizontal walls 19 and 20 of the chute portions 13 and 17 are interconnected by a hinge 21 that extends transversely of the chute. Hence, the section 17 can be pivoted upwardly in the manner illustrated in FIGURE 2 relative to the fixed chute part 13.

The section 17 of the chute 10 extends downwardly at an angle to a lid 22 adapted to fit over the upper edge 23 of the rubbish container 12. The lid is of conventional shape, including a flange 24 that overlaps the upper perimeter of the container 12. The bottom end 26 of the chute portion 14 extends through an opening complementarily formed in the central portion of the lid 22, and the members 17 and 22 are permanently attached together, such as by soldering or welding. It can be seen, therefore, that open communicating is provided through the chute 10 in the interior of the container 12.

In order that the chute portion 17 may be pivoted upwardly, as indicated in FIGURE 2, the hinge 21 must be positioned properly. This is to assure that all portions of the lid 22 are at the lowest point of the arc described by the lid when the lid is in place on the container 12. That is to say, the hinge 21 must be in a vertical plane that falls between the lid 22 and the wall 11, or which is tangent to the inner surface of the flange 24 at the point 28 that is beneath the longitudinal axis of the chute and closest to the wall 11. This is in order that all parts of the lid will move upwardly when the pivoting action takes place.

When constructed in this manner, as the container 12 is slid outwardly the lid can pivot freely and will not bind on the upper edge 23 of the container 12. However, if the vertical plane of the hinge 21 were to intersect the lid over the can 23, the point 28 would move downwardly as the pivoting was begun. This initial downward movement of the portion of the lid adjacent the wall would cause interference between the undersurface of the lid 22 and the upper edge 23 of the container 12, and preclude the separation of these members.

At the inner end of the upper chute section 13 there is a door 30 connected to the upper horizontal wall 19 by a hinge 31. Normally, this will be a spring-loaded hinge so that the door will be biased in a counter-clockwise direction as illustrated in FIGURES 1 and 3. Extending over the flashing 14 and slightly overlapping the inner edge of the chute section 13 is a decorative molding 32. Not only does this hide the flashing 14 from view, but also it acts as a stop to limit the counter-clockwise rotation of the lid 30. A gasket 33, normally of elastomeric material, fits around the inner edge of the molding 32. Hence, the lid 30 in its normal position is held by its spring-loaded hinge against the gasket 33. This gasket, therefore, assures that there is a seal at the entrance to the chute section 13, which precludes the passage of vapors from the container 12 into the room on the inside of the wall 11. In other words, odors from the rubbish can 12 will be prevented from permeating the inside room because of the sealed chute entrance. The gasket also prevents the door 30 from clanging against the molding 32 when the lid returns to its normal position, shown in solid lines.

In use of the chute arrangement of this invention, the lid 30 is pressed inwardly, as indicated in phantom, providing access to the chute interior. The rubbish is placed in the chute so that it will slide down the section 17 into the container. As soon as the force is removed from the door 30, it returns to its normal position under the influence of spring 34, closing off the chute entrance. Thus, immediately the rubbish is out of sight and completely disposed of into the rubbish receptacle 12.

When the receptacle 12 is to be emptied, the lid 22 is pivoted upwardly by grasping the handle 35 at the forward position of the lid. At the same time, a pull is exerted on the handle 36 attached to the container 12, thereby sliding the container 12 outwardly, generally as indicated in FIGURE 2. Hence, the container quite easily is removed from the chute and can be taken away so for disposal of the refuse. With the container 12 removed from the chute assembly 10, a conventional lid can be placed over its top edge 23 to keep it closed.

When empty, the container is returned by reversal of the removing procedure. In other words, the lid 22 is lifted upwardly as the chute section 17 pivots about the hinge 21. The container then is slid underneath the lid, and the two are brought back to their original position. As the lid and container approach the installed position, the flange 24 in the lid helps align the container 12 with the chute so that the lid and receptacle will have a proper sealed relationship. The can is shoved back until the edges 15 and 16 of the chute sections 13 and 17 come into contact, which automatically stops the inward movement of the container 12. Thus, the chute becomes completely closed when the edges 15 and 16 are brought together, and the movement of the container 12 is terminated.

It may be noted that the device not only is convenient to use when removing the container 12 or returning it, but also it is readily cleaned when this is needed. There is access both from the top and from the bottom of the chute, and it can be washed out thoroughly when the container is out of the way. Thus, maintenance of the unit is readily effected.

From the foregoing it may be seen that the rubbish disposal device of this invention is an effective and versatile arrangement which always maintains the rubbish container sealed. It is particularly adapted for installations in residences, but finds equal utility in commercial buildings where refuse is to be dealt with. It can be made in various sizes to accommodate the storage capacity needed for the amount of rubbish anticipated. For example, for a bathroom the device will be made somewhat smaller than for the main rubbish unit in a kitchen area. The advantage of the quick release of the container and the easy reinstallation described above are present regardless of the size of the unit. While shown and described as including separate elements for the lid 22 and the pivotal chute portion 17, it is apparent that the lower end of the chute may be enlarged to incorporate the lid as an integral part.

The foregoing detailed description is to be clearly understood as given by way of illustration and example only, the spirit and scope of this invention being limited solely by the appended claims.

I claim:
1. In combination with a wall having an opening and a container adapted to receive a quantity of rubbish,
    a rubbish disposal arrangement comprising a first horizontal chute member secured to said wall
        having an entrance opening at said wall, and extending through said opening to a point exteriorly of said wall,
    a second chute member inclined downwardly from said first chute member toward said container,
        said second chute member communicating with said first chute member
            and being adapted to transmit rubbish from said chute members to said container,
    a hinge interconnecting said first and second chute members,
    and a lid,
        said lid having an opening,
            said second chute member being secured to said lid at said opening, whereby said lid is movable with said second chute member,
        said lid having a depending flange adapted to circumscribe the upper edge of said container with the inner surface of said flange adjacent the exterior surface of said upper edge,
            whereby said lid defines a closure for said container,
        said hinge being transverse of said chute members,
            and falling in a vertical plane no closer to an intersection with said lid than a point tangent to the inner surface of said flange at a location immediately below the longitudinal axes of said chute members.

2. A device as recited in claim 1 including in addition a pivotal door at said entrance opening of said first chute member,
    and sealing means normally engaging said door for precluding the transmission of fumes through said chute.

3. A device as recited in claim 2 including in addition resilient means biasing said door against said seal.

4. In combination with a wall having an opening therethrough and a receptacle for receiving rubbish, a rubbish disposal arrangement comprising
    a first chute member extending through said opening in said wall above said container,
    a second chute member communicating with said first chute member and extending downwardly to said container,
    a hinge interconnecting said chute members for permitting said second chute member to pivot upwardly relative to said first chute member,
    and a lid,
        said lid having an opening therethrough,
            said second chute member being attached to said lid at said opening for transmitting rubbish through said opening,
        said lid being dimensioned to fit over said container and provide a closure therefor,
    said hinge falling in a vertical plane no closer to an intersection with said lid than at a point tangent with the inner edge of said lid at a location immediately below the longitudinal axis of said chute members.

(References on following page)

References Cited by the Examiner

UNITED STATES PATENTS

| | | | |
|---|---|---|---|
| 1,028,577 | 6/1912 | Lucking | 193—33 |
| 1,071,535 | 8/1913 | Townshend | 193—34 X |
| 1,538,240 | 5/1925 | Claudepierre | 193—34 X |
| 1,648,065 | 11/1927 | Schulert | 193—34 |
| 1,707,049 | 3/1929 | Cohan | 232—19 |
| 1,797,489 | 3/1931 | Wemhoner | 232—19 |
| 3,061,063 | 10/1962 | Rutten | 193—17 |
| 3,171,447 | 3/1965 | Fowler et al. | 193—34 X |

EVON C. BLUNK, *Primary Examiner.*

SAMUEL F. COLEMAN, *Examiner.*

A. L. LEVINE, A. H. NIELSEN, *Assistant Examiners.*